Aug. 1, 1933.  P. HOGAN  1,920,791
METHOD OF SOLDERING TOGETHER CYLINDRICAL SURFACES
Filed May 13, 1931  2 Sheets-Sheet 1

Inventor.
Philip Hogan
by Heard Smith & Tennant.
Attys.

Aug. 1, 1933.  P. HOGAN  1,920,791
METHOD OF SOLDERING TOGETHER CYLINDRICAL SURFACES
Filed May 13, 1931  2 Sheets-Sheet 2

Inventor.
Philip Hogan
by Heard Smith & Tennant.
Attys.

Patented Aug. 1, 1933

1,920,791

UNITED STATES PATENT OFFICE 1,920,791

METHOD OF SOLDERING TOGETHER CYLINDRICAL SURFACES

Philip Hogan, Newton, Mass.

Application May 13, 1931. Serial No. 537,013

4 Claims. (Cl. 113—112)

This invention relates to a method of soldering together two cylindrical objects, one of which is situated inside the other.

While the invention is capable of a wide range of use it is specially adapted for making joints in the splicing of lead-sheathed transmission cables.

In the splicing of such transmission cables, whether used as communication lines or for power transmission, it is a common practice to first splice together the ends of the wires of two cable ends and then to place a sleeve over the spliced wire ends, the ends of which overlie the ends of the lead sheath of the cable ends, and subsequently to unite each end of the lead sleeve to the corresponding lead cable sheath by a wiped solder joint.

The making of a proper wiped joint is a difficult task and requires a high degree of skill on the part of the operator.

One object of my invention is to provide a novel method of making a satisfactory joint between the lead sleeve and the lead sheath of the cable which can be practiced by any ordinary unskilled workman.

As stated above, however, the invention is not limited in its use to the splicing of transmission cables but is capable of being used for a great variety of purposes where it is necessary to solder together two members or objects that have a sufficient amount of surface contact with each other.

In the drawings wherein I have illustrated the invention as applied to the splicing of transmission cables, Fig. 1 is a sectional view showing one step in my improved method;

Fig. 9 shows another step of the method of which Fig. 8 is an illustration;

As stated above my improved method is capable of use in making a satisfactory joint between a great variety of different objects but especially between two cylindrical objects, one of which is located inside the other, as for instance between the lead sheath of a transmission cable and the lead sleeve which is used in making a splice in such a cable, and hence I will describe the invention as applied to the splicing of transmission cables.

Figure 1:
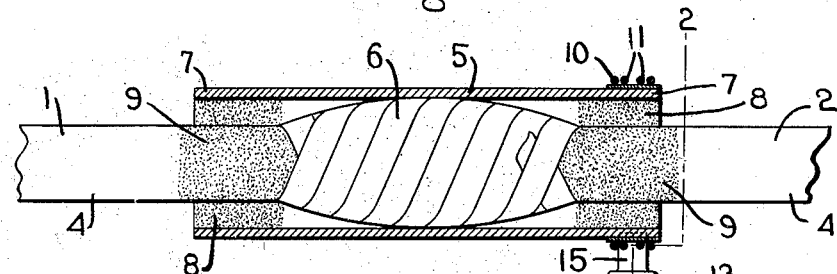
Figure 2:
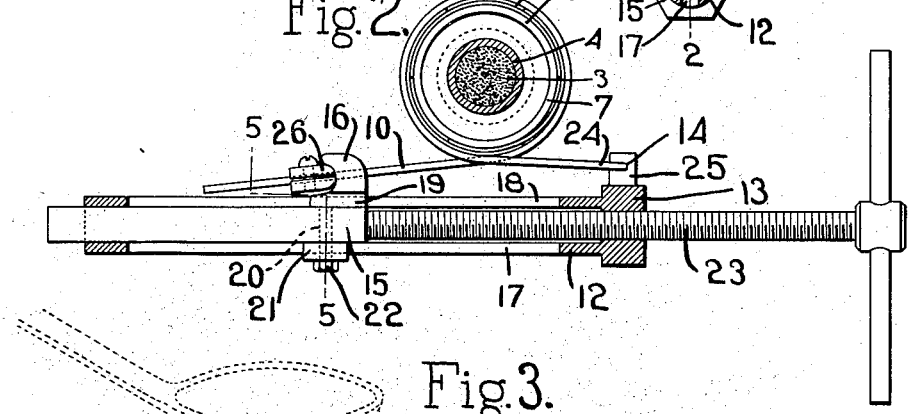
Fig. 2 is a section on the line 2—2, Fig. 1.

In Fig. 1, 1 and 2 represent the ends of two transmission cables which are to be spliced, each transmission cable comprising the usual circuit wires 3 which are properly insulated from each other and are enclosed in a lead sheath 4. As is well understood by those skilled in the art the splicing together of the ends of two cables 1 and 2 involves splicing together the wires 3 and then placing a sleeve 5, preferably of lead, over the spliced ends of the wires and soldering the ends 7 of the sleeve 5 to the sheaths 4 of the cable ends 1 and 2, it being understood that the bundle of spliced wires is first usually wrapped with an insulating tape as shown at 6. As stated above, the method usually employed for soldering the ends 7 of the sleeve 5 to the sheaths 4 consists in first reducing the diameter of said ends 7 so that they contact with the sheath 4 and then making a wiped soldered joint, which is a more or less difficult thing to do.

In accordance with my improved method I first tin or apply a coating of solder to either the interior surface of the sleeve 5 at each end 7 or to the exterior surface of the lead sheath 4 at the point where the joint is to be made, or to both surfaces, and then the end of the sleeve is reduced in diameter and brought into contact with the cable sheath 4, and heat is applied to the ends of the sleeve sufficient to fuse or melt the solder material which has been applied to the sleeve or the sheath or both thereby sweating or uniting the sleeve to the sheath. If desired, pressure may be applied exteriorly to the sleeve ends when the soldering material has been brought to a fusing condition as this will result in a better joint.

While the heat may be applied in any approved way I find that one simple expedient is to use a solder having a low fusing point and to apply the heat by pouring over the sleeve end melted paraffin or hot oil or some other liquid having a boiling temperature higher than the fusing point of the solder.

Referring now particularly to Figs. 1 to 5 the sleeve 5 is shown as having its interior surface at each end provided with a coating of solder as indicated at 8 and the sheath of each cable 1, 2 is also provided with a coat of solder or soldering material 9 at the point where the joint is to be formed. This operation of applying a coating of soldering material to a surface is often referred to as "tinning" the surface. It will be understood, of course, that the tinned surface 8 will be applied to the interior of the sleeve at each end before the sleeve is assembled with the cable ends as shown in Fig. 1.

After the tinned sleeve is thus assembled then the ends of the sleeve are reduced in diameter to bring the tinned surfaces 8 thereon into contact or engagement with the tinned surface 9 of the two sheaths 4. This reduction of the diameter of the sleeve 5 at its ends may be accomplished in various ways. In Figs. 1 and 2, I have shown a simple tool for accomplishing this object. This tool comprises a flexible sleeve-reducing member having a loop portion adapted to encircle the end of the sleeve together with means for reducing the size of the loop portion and thereby reducing the diameter of the sleeve at the end to bring it into contact with the sheath.

The flexible sleeve-reducing member is indicated at 10 and it is shown as in the form of a wire cable or other flexible connection which may be formed into the loop 11 adapted to encircle the end 7 of the sleeve 5. The means for contracting the loop 11 comprises a tubular member 12 having a head 13 to which one end of the flexible connection 10 is secured as shown at 14 and a slide 15 fitting within the tubular member 12 and to which the other end of the flexible connection 10 is secured. The slide 15 has a block or head 16 rigidly secured thereto which is situated on the exterior of the tubular member 12.

The tubular member 12 is shown as provided with the oppositely-disposed slots 17, 18 extending longitudinally thereof and the head 16 is provided with a fin 19 which occupies the slot 18 and is also provided with a stud 20 which extends through the slide 15. Said stud carries a shoe 21 which operates in the slot 17, said shoe being retained on the stud by a suitable nut 22.

23 indicates an actuating screw which is screw threaded through the head 13 and is adapted to engage the end of the slide 15. By turning the screw 23 in a direction to advance the slide 15 toward the left, the loop 11 will be reduced in size thereby contracting the end of the sleeve 5.

Figure 6:
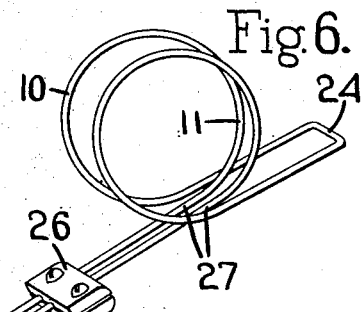
Fig. 6 is a fragmentary perspective view of the sleeve-reducing element.

I have herein shown the flexible connection 10 as a double element formed with the loop or bight 24 which extends through a projection 25 rigid with the head 13. The free ends of the double flexible connection have a clamp 26 secured thereto, which clamp is adapted to be engaged by the head 16 that is hook shaped for this purpose. By arranging the loop 11 as shown in Fig. 6 so that the end portions 27 thereof pass between the two sides of the loop 24, the strain on the loop will be balanced so that it will apply no twisting tendency to the sleeve as the loop is contracted. Since the free ends of the flexible connection are easily detachable from the head 16 it is possible to easily and quickly apply this reducing or sleeve-contracting member to the end of the sleeve.

I will preferably interpose a collapsible reinforcing sleeve 28 between the loop 11 and the end 7 of the sleeve 5 so that the diameter-reducing pressure will be applied evenly to the sleeve and the separate strands of the flexible connection will be prevented from cutting into the soft metal of the sleeve.

This reinforcing or protecting sleeve 28 is a contractible sleeve and is shown made up of a plurality of sections 29 which have an overlapping relation, said sections being free to slide on each other. These sections are of sufficiently flexible material so that upon reduction of the diameter of the loop 11 the sections not only slide on each other, but flex sufficiently to conform to the diminishing diameter of the sleeve end.

Figure 3:
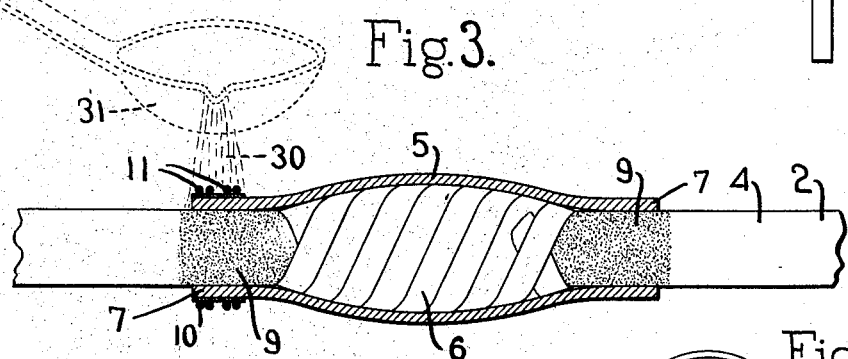
Fig. 3 shows a subsequent step in the method.
Figure 5:
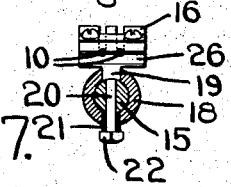
Fig. 5 is a section on the line 5—5, Fig. 2.

With this simple tool it is a relatively easy matter to reduce the diameter of the ends of the sleeve 5 from the full diameter shown in Fig. 1 to that shown in Fig. 3 wherein the sleeve ends are reduced to a size to fit closely the sheath 4.

When the ends 7 of the sleeve have been thus reduced said reduced sleeve ends are heated sufficiently to fuse the solder material 8 and/or 9. This fusing of the solder material and subsequently allowing it to cool produces a tight joint.

In order to make a perfectly satisfactory joint it is desirable that pressure should be applied to the sleeve end when the solder has been fused and maintained until the solder has solidified again. This may be accomplished by keeping the sleeve-reducing implement in position on the end of the sleeve while the fusing of the solder and its subsequent cooling takes place, and if desired, an added pressure may be applied to the sleeve end just after the solder becomes fused by giving the screw 23 an added turning movement.

There are some solders that shrink slightly in volume upon becoming melted or fused and this application of added pressure is highly desirable when solders of this type are used because as soon as the solder is fused the added pressure serves to compress the end 7 of the sleeve still further and thus make it fit firmly against and conform to the sheath 4.

While any appropriate way of heating the sleeve end may be employed I prefer to accomplish this by pouring over the sleeve end melted paraffin, hot oil or some other appropriate liquid which is at a temperature sufficiently higher than the fusing point of the solder so that the operation of pouring the hot liquid over the sleeve end will heat the latter sufficiently to fuse the solder. It is possible to use melted paraffin for this purpose if a solder having a sufficiently low fusing point is employed, that is, a solder which has a fusing point somewhat below the flashing point of paraffin.

In Fig. 3 is illustrated the operation of pouring melted paraffin, hot oil or other hot liquid 30 over the reduced end 7 of the sleeve 5 by means of a suitable ladle 31.

A soldered joint made according to the above method is as satisfactory as a wiped joint and it can be made by one who does not possess sufficient skill to make a satisfactory wiped joint.

Figure 7:
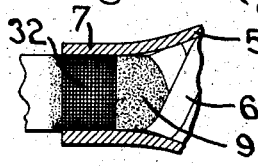
Fig. 7 is a fragmentary sectional view showing a modification of the invention.
Figure 4:
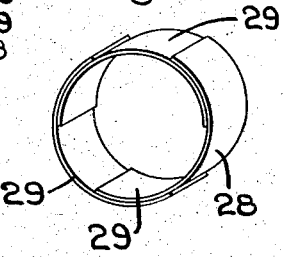
Fig. 4 illustrates the compression sleeve which may be employed.

In Fig. 7, I have shown a joint such as above described in which there is a cylindrical band 32 of a fine mesh screen-like material interposed between the reduced end 7 of the sleeve 5 and the sheath 4. The purpose of this band is to assist in retaining the solder in position when it is fused so that it will not gravitate to the lower side of the sheath. I have found from experiment, however, that this screen 32 is not necessary and that a satisfactory joint can be made without it.

Figure 8:
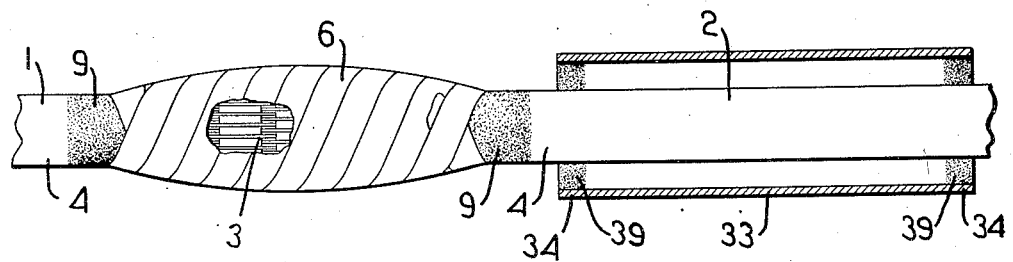
Fig. 8 shows one step of the method involving the invention but somewhat different from the method shown in Figs. 1, 2 and 3.
Figure 9:
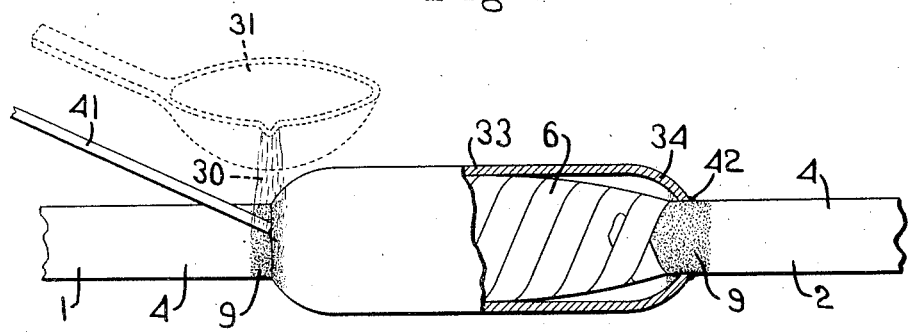
Figure 10:
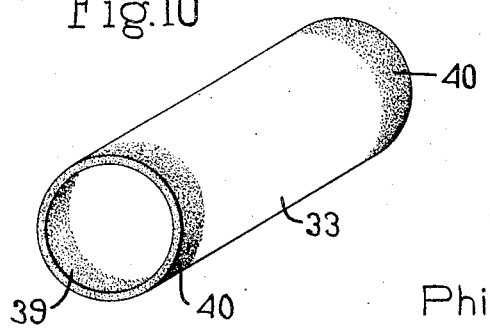
Fig. 10 is a perspective view of the sleeve which is used in making the joint.

In Figs. 8, 9 and 10, I have illustrated a somewhat different manner of carrying out my process. As shown in these figures the sheath 4 of each cable end 1, 2 is tinned as shown at 9 as above described and the sleeve 33 (which corresponds to the sleeve 5 in Fig. 1) is tinned at each end 34 both inside and outside as indicated at 39 and 40. In applying my method in the manner shown in Figs. 8 and 9 the sleeve 33 is put into place after the wires 3 have been properly spliced and then the ends 34 of the sleeve are reduced in diameter in any usual way until they fit against and engage the tinned portions 9 of the two cable sheaths. This reduction in diameter may be accomplished by swedging, pounding or peening the end of the sleeve.

After the sleeve ends have been thus shaped to fit the sheaths 4 the hot paraffin, hot oil or other hot liquid 30 is poured over the ends of the sleeve 33 as shown in Fig. 9 thereby melting the solder material 9, 39 and 40. If desired, I may also apply additional solder to the joint as the joint is heated as shown at 42. This may be done by wiping the end of a stick 41 of solder around the joint during the pouring process. The heat from the hot liquid will melt the solder 41 and by manipulating said stick of solder a mass of solder may be applied to the joint as shown at 42.

While I have herein illustrated my improvements as applied to the making of a joint used in splicing lead covered transmission cables yet it is obvious that the same method might be used in joining together other cylindrical objects than the sleeve 5 and the sheath 4.

I claim.

1. The steps in the method of making a spliced joint in a transmission cable having a lead sheath which consists in applying a coating of solder material to the inside of the joint sleeve at the ends thereof and also to the exterior of the sheath of the cable ends at the portion where said sheaths are to be soldered to the sleeve, placing the sleeve in its proper position relative to the joint, reducing the diameter of the sleeve at its ends to fit the enclosed sheath, heating the sleeve ends sufficiently to fuse the soldering material, and pressing the reduced ends of the sleeve firmly against the sheath as the solder fuses.

2. The steps in the method of making a spliced joint in a transmission cable having a lead sheath which consists in applying a coating of solder material to the inside of the joint sleeve at the ends thereof and also to the exterior of the sheath of the cable ends at the portion where said sheaths are to be soldered to the sleeve, placing the sleeve in its proper position relative to the joint, reducing the diameter of the sleeve at its ends to fit the enclose sheath, pouring over the reduced sleeve ends liquid at a sufficiently high temperature to melt the soldering material and subjecting the reduced sleeve ends to a compressing pressure as the soldering material fuses.

3. The steps in the method of making a splice joint in a transmission cable having a lead sheath which consists in placing soldering material between the end of the joint sleeve and the end of the cable sheath to which the joint sleeve is to be soldered, reducing the diameter of the sleeve at its end to fit the enclosed sheath by the application of pressure to said sleeve, heating the reduced sleeve end sufficiently to fuse the soldering material and after the soldering material is melted subjecting the reduced end of the sleeve to additional pressure and maintaining such pressure until the soldering material is safely congealed.

4. The steps in the method of making a splice joint in a transmission cable having a lead sheath which consists in placing soldering material between the end of the joint sleeve and the end of the cable sheath to which the joint sleeve is to be soldered, reducing by pressure the diameter of the sleeve at its end to fit the enclosed sheath, pouring over the reduced sleeve end liquid at a sufficiently high temperature to melt the soldering material and subjecting the reduced sleeve end to an additional compressing pressure when the soldering material fuses.

PHILIP HOGAN.